(12) United States Patent (10) Patent No.: US 7,913,375 B2
Pulnikov (45) Date of Patent: Mar. 29, 2011

(54) METHOD FOR MAKING ELECTRICAL WINDINGS FOR ELECTRICAL MACHINES AND WINDING OBTAINED BY SAID METHOD

(75) Inventor: Sergey Pulnikov, Villingen-Schwenningen (DE)

(73) Assignee: Sergey Pulnikov, Villingen-Schwenningen (DE)

( * ) Notice: Subject to any disclaimer, the term of this patent is extended or adjusted under 35 U.S.C. 154(b) by 0 days.

(21) Appl. No.: 12/355,858

(22) Filed: Jan. 19, 2009

(65) Prior Publication Data

US 2010/0181860 A1 Jul. 22, 2010

(51) Int. Cl.
*H02K 15/00* (2006.01)
(52) U.S. Cl. ......................................................... 29/596
(58) Field of Classification Search ............ 29/596–598, 29/605–606, 732–736
See application file for complete search history.

(56) References Cited

U.S. PATENT DOCUMENTS

| | | | |
|---|---|---|---|
| 3,295,034 A | 12/1966 | Herzog | |
| 3,324,322 A | 6/1967 | Johns | |
| 5,231,324 A | 7/1993 | Kawamura et al. | |
| 5,793,138 A | * 8/1998 | Kliman et al. | ............... 310/211 |
| 5,898,251 A | 4/1999 | Mochizuki et al. | |
| 6,560,854 B2 | * 5/2003 | Nam et al. | ...................... 29/605 |
| 2002/0060263 A1 | * 5/2002 | Nam et al. | ................... 242/432 |
| 2009/0083965 A1 | * 4/2009 | Tokizawa | ...................... 29/596 |

\* cited by examiner

*Primary Examiner* — Nguyen N Hanh

(57) ABSTRACT

This invention presents a novel method for designing and manufacturing electrical windings for electrical machines. The presented manufacturing technique gives possibilities for an increased filling factor compared to conventional technique and improved heat transfer through application of thermally conductive compounds. The ready winding represents a solid body and has the strictly determined geometrical form. The slot part of the ready winding represents rods. These rods are the composite material consisting of coils of the insulated copper wire and any compound. The cross section of these rods precisely coincides with the cross section of slots of stator and differs only on the value of the tolerance necessary for assembling. End parts of the ready winding represent rings from a composite material. Visual appearance of a winding reminds the squirrel cage of a rotor of the asynchronous motor. The specified technology provides high precision of manufacturing of a winding. The winding represents a separate detail and ready assembly unit of the electrical machines, which easy insert into stator. Ptroposed windings are interchangeable. The specified property of the proposed winding structure facilitates maintenance and repair. The specified property of the proposed winding structure facilitates maintenance and repair.

11 Claims, 7 Drawing Sheets

METHOD FOR MAKING ELECTRICAL WINDINGS FOR ELECTRICAL MACHINES AND WINDING OBTAINED BY SAID METHOD

TECHNICAL FIELD

This invention is related to the production of electrical windings for conventional electrical machines with slots and slotless electrical machines.

BACKGROUND INFORMATION

Discussion of the Prior Art

Conventional manufacturing technique for stator windings is based on inserting of prewound coils in the stator slots. As a result of insertion the order of wires in slots can be distorted. For this reason these windings are called random. Distortion of the order can lead to reduction of the filling factor. Besides, random distribution of wires can cause non-uniform electrical load on the wire insulation. A full phase voltage might be present between two neighboring wires. This imposes a requirement that the wire insulation should be able to sustain the full operating voltage. For a winding with controlled location of the wires such a requirement would be excessive. Therefore this technique leads to incomplete use of wire insulation. During insertion there is a chance of damaging wire insulation. After that forming may be done for the end-winding in order to achieve necessary compactness of the end-winding and allow rotor assembly into the stator. In order to recover insulation properties, the stator with the winding is dipped into epoxy bath. Impregnation with epoxy also improves thermal conductivity between the winding and the stator. This is important, since high winding temperature can lead to thermal degradation of insulation. Bringing epoxy in the space between wires is a trivial task. But impregnating slot insulation might require high pressure, which is often omitted due to increase of production costs. The stator windings are usually cooled through the stator core. This puts the slot region of the winding in a certain advantage with respect to the end-winding region. In order to cool down end-winding region either air-cooling or potting are applied. However potting requires special tooling and is usually avoided.

The number of layers in such windings is normally limited to two. On rare occasions three layers can be encountered. However in most cases, especially in low power machines, only one phase is present in each stator slot. Despite reduction in cost, this adversely affects the quality of the stator magnetic field and leads to extra losses in the machine.

Since recently concentrated teeth windings are being used. These windings are convenient for automatic manufacturing. However they provide even lower filling factor compared to random windings. In addition to that concentrated teeth windings generally give poor stator field quality.

Manufacturing techniques presented in this invention offer a solution for the aforementioned problems. The main goal of this invention is to provide such a technique that gives higher filling factor, higher heat transfer from the winding, higher reliability of insulation of the winding and reduced manufacturing costs through extensive use of automation. This goal can be achieved by manufacturing multilayered preliminary made winding systems without intersected end-windings and with ordered location of the wires.

SUMMARY OF INVENTION

One of the primary objects of the present invention is to provide a method of manufacturing an insertable self-supporting preliminary made electrical winding for stators of electrical machines with or without slots.

Another object of the present invention is to avoid any damage to the insulation during winding.

A further object of the present invention is to conduct winding and impregnation in a single operation.

A further object of the present invention is to allow a simple use of thermally conductive impregnating compounds.

A further object of the present invention is to allow a simple use of permeable impregnating compounds.

A further object of the present invention is to provide a possibility for applying a magnetic field to said permeable compound.

A further object of invention is to provide an easy way of introducing interlayer and slot insulation.

A further object of invention is to provide a way of introducing fiber reinforcement into the winding when extra rigidity is required.

A further object of invention is to provide a possibility for increasing current density in the winding.

Depending on the specific power of the motor, different goals get different priorities. For instance, in low power machines energy density is relatively low and thermal issues are less important. On the other hand, simplicity of a selected manufacturing technology could be crucial in providing a competitive product. In large power machines the energy density is high and providing acceptable winding temperature is the key for a stable operation of the motor. Reducing the winding temperature should not necessarily be the target. If through introduction of a new winding technique the same winding temperature could be achieved with a simplified cooling system, the total cost could be reduced and the general reliability of the motor could be increased via improved reliability of the cooling system.

Embodiment 7 will be described with reference to the accompanying drawings, in which.

EMBODIMENT 7

Insertable Windings Made of Round Wire for Stators with Slots

In a majority of electrical machines stators contain teeth and slots wherein a stator winding is laid. The proposed technology provides a possibility for manufacturing preliminary made stator windings suitable for insertion into stator slots.

Figure 1:
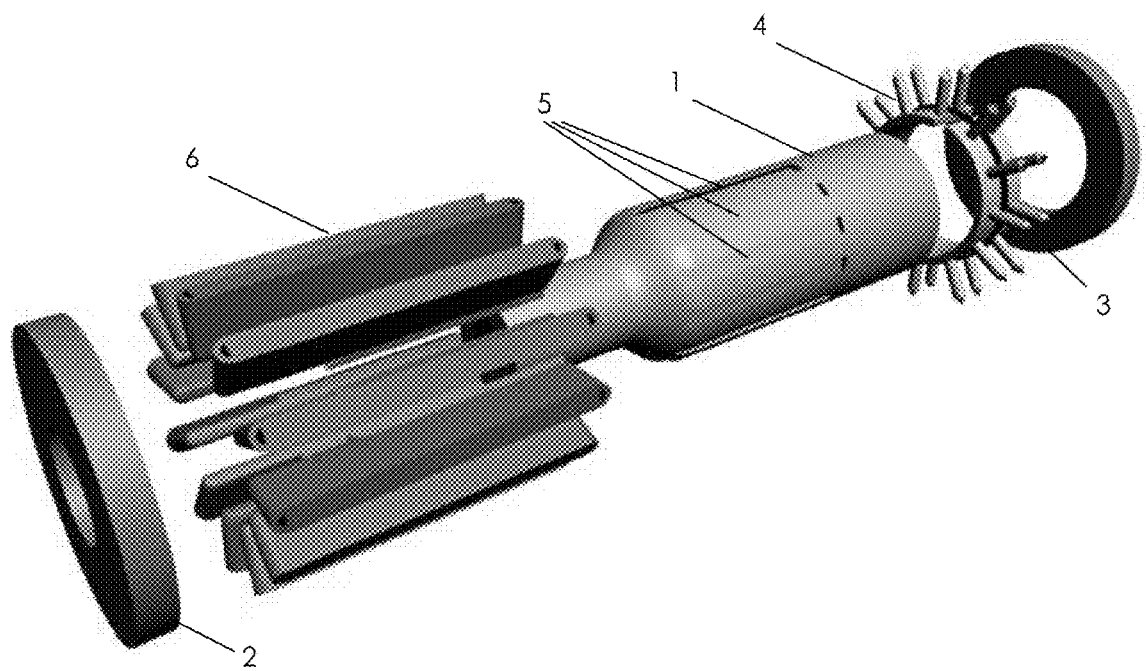
FIG. 1 represents a mandrel for manufacturing a winding for a stator with slots, extractable teeth corresponding to the profile of stator teeth, side rings and a ribbon with turning pins.

In FIG. 1 basic elements of a mandrel (1) and auxiliary tooling are demonstrated. The teeth (6) installed on the mandrel should have a cross-section corresponding to the cross-section of the teeth of the stator wherein the winding is supposed to be inserted. That is the winding can be inserted both in opened, and into semi-closed stator slots. Since the winding has to be insertable into the stator slots, the low end-winding region has to be situated under the teeth. For this reason the teeth are hanging over the low end-winding region of the mandrel. In order to avoid any damage to the insulation of the wire, all sharp edges have to be removed from the tooling. Round edges would be preferable. Skilled in the art can find relation between the radius of the wire, insulation type and the radius of round edges of the tooling.

Figure 2:
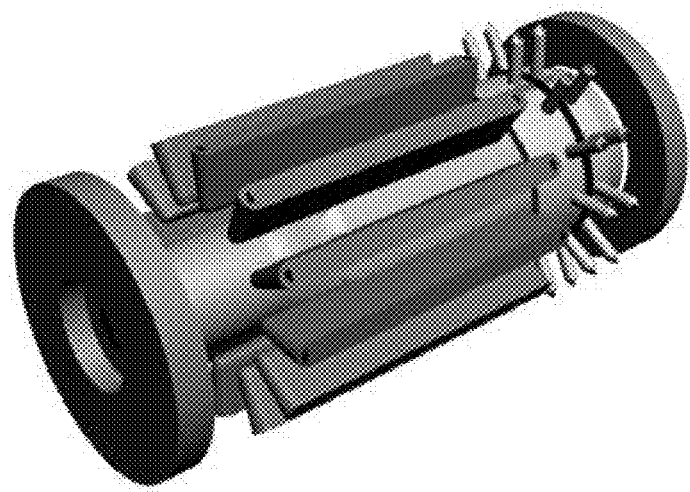
FIG. 2 represents an assembly of a mandrel for manufacturing a winding for a stator with slots, extractable teeth corresponding to the profile of stator teeth, side rings and a ribbon with turning pins.
Figure 3:
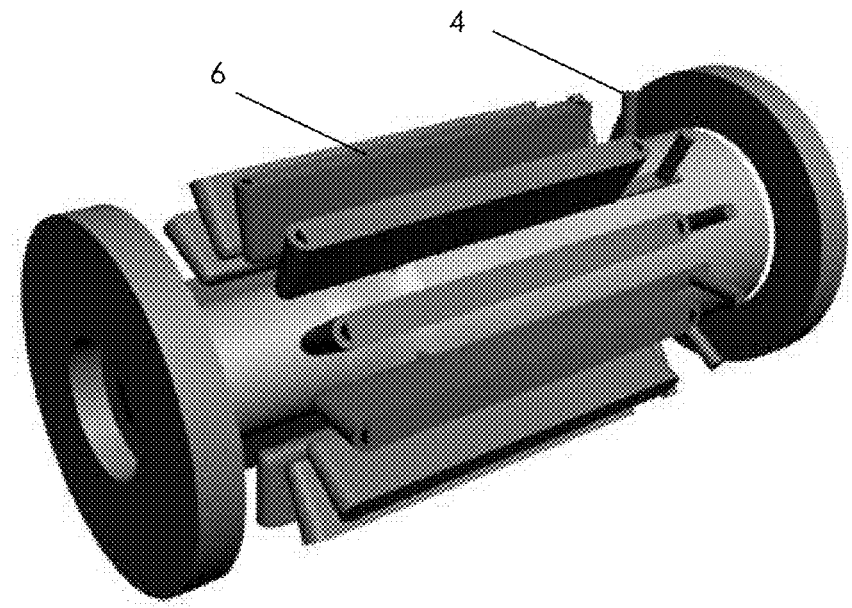
FIG. 3 represents an assembly of a mandrel for manufacturing a winding for a stator with slots, side rings and extractable teeth corresponding to the stator teeth and containing turning pins.
Figure 4:
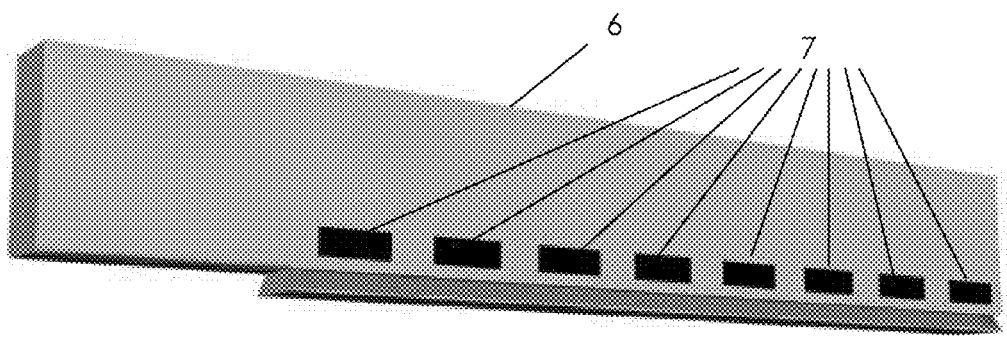
FIG. 4 represents a principle structure of an extractable tooth with embedded permanent magnets.

Teeth hanging over the low end-winding region of the mandrel will serve as turning points. Turning points in the top end-winding region can be installed separately. An example of such an installation is shown in FIG. 2. Turning points can also be a part of teeth, as demonstrated in FIG. 3. There can be a few rows of turning points.

Medium power machines require slot insulation for mechanical and eventually electrical protection of the winding. Besides, in order to reduce effect of slots and decrease ripples in the stator field, the slots should preferably be performed closed or semi-closed. This complicates insertion of the winding. Therefore a magnetic wedge is sometimes inserted into the slot. The proposed technology offers a possibility for manufacturing magnetic wedge together with the winding.

Figure 5:
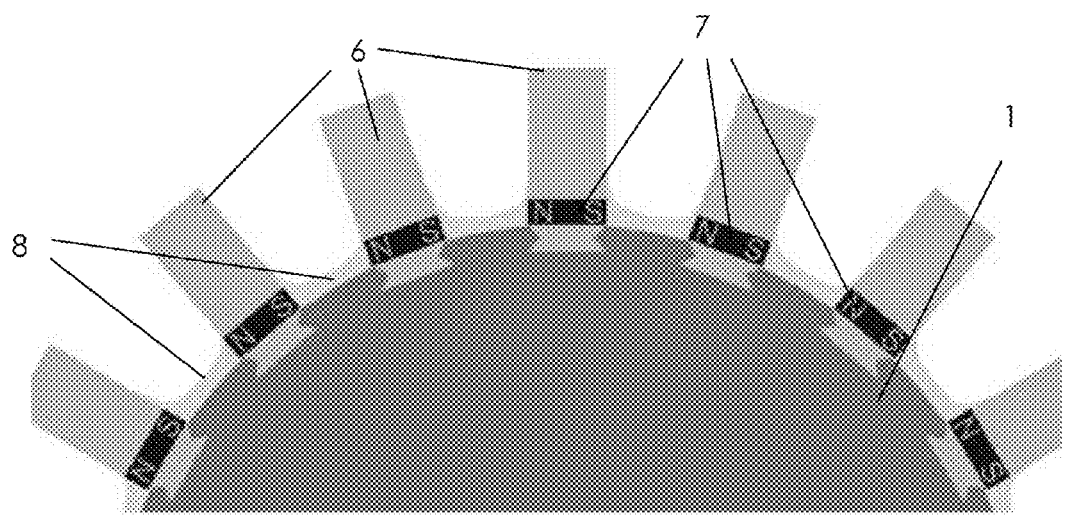
FIG. 5 represents a cross-section of a mandrel with extractable teeth containing embedded permanent magnets and a layer of compound containing soft-magnetic powder.

The magnetic wedge is usually made of a semi-permeable material consisting of a polymer saturated with soft-magnetic powder. So for introducing magnetic wedge into the lowest part of the slot magnetic compound should be used. Magnetic compound is a mixture of a polymer with magnetic, preferably iron, powder. This compound 8 should be placed at the bottom of the slots before the winding starts. The teeth 6 installed in the mandrel 1 have embedded permanent magnets 7 (FIG. 5). The magnets are oriented accordingly in all teeth forming a closed magnetic field (FIG. 5). The purpose of this field is to align the magnetic powder in the magnetic compound 8. The magnetic field will also stop the magnetic compound from spreading within the slot as the winding process is started. The magnetic compound can optionally be cured in order to maintain its thickness. The mandrel and teeth should preferably be made of a nonmagnetic metal in order to avoid distortion of the field. A material of permanent magnets should have a maximum operating temperature exceeding the curing temperature of the polymer used in the said compound.

The slot insulation can be provided by pouring a certain amount of thermally conducting insulating compound on the horizontally rotating mandrel. By performing rotating movements a uniform distribution of the compound over the operating surface of the mandrel can be achieved. In some cases forward and reverse rotation of the mandrel might be required in order to achieve a uniform distribution of the compound over the operating surface of the teeth. For each specific geometry of the mandrel and viscosity of the compound the optimal turning speed can be found that would provide a uniform distribution of the compound over the operating surface of the mandrel and teeth. The acquired insulation layer can then be cured. So the wire would be unable to penetrate through this layer during the winding process.

It is possible to avoid this intermediate curing by inserting a ring made of insulating material and matching the outer shape of the mandrel. A plastic ring of such a shape and having thin walls is too flexible and cannot guarantee high dimensional accuracy of the winding. So there is still a need in internal support. The mandrel with teeth would provide such support. As will be explained later, the winding will eventually have quite high rigidity.

Instead of a closed plastic ring a flexible plastic net with cuts for teeth can be installed over the mandrel with teeth. The compound would penetrate through the openings in the net.

If additional rigidity is required for the end-winding region, glass fiber reinforcement can be brought into it. Glass fiber prepreg or wet glass fiber can be wound on the mandrel in the end-winding region.

Before the winding with magnet wire begins, a layer of thermally conducting compound has to be brought on the operating region of the mandrel. After that the end wire has to be fixed on the mandrel or a side ring. The winding is supplied from a table moving horizontally with respect to the rotating mandrel. The table also contains pretension system and optionally impregnation system, the use of which will be discussed later. As the mandrel performs rotating movement, this will keep the thermally conducting compound well distributed over the operating region of the mandrel.

The preferable configuration for the winding is a concentric one. The wire is turned around turning pins. It is important to keep a certain distance between the teeth and the turning pins, because this will provide a possibility for compacting the winding 10. As demonstrated in FIG. 6, a bandage 11 is wound between the teeth end and the turning pins 4 around the completed layer in order to increase the filling factor in the slots.

After the layer is finished and compacted, an interlayer insulation can be introduced. A thin layer of epoxy curable with UV radiation can be sprayed over the wound layer of the winding. After that some UV radiation can be applied in order to provide a barrier between neighboring layers.

The wires situated on top of the considered layer come in touch with the next layer. So insulation of these wires is subjected to the interlayer voltage. Therefore either an extra insulation layer has to be introduced, which is usually done, or the wire insulation has to be reinforced.

In conventional manufacturing technique location of an individual wire cannot be accurately predicted. Since the winding is generally external, location of a wire is more controllable. So an extra insulation can be introduced on the right moment.

Strengthening of wire insulation can be done by bringing some UV curable epoxy on the wire in the impregnation system located on the moving table. This epoxy has to be cured before the wire reaches the mandrel. The wire insulation of the first turns of the subsequent layer can be treated the same way as the last turns of the previous layer.

It is also possible to introduce a preliminary made interlayer insulation made of plastic or any other suitable insulating material. Since thermally conducting compound situated in the winding has insulating properties, the preliminary made interlayer insulation can have openings in order to let compound from the completed and compacted underneath layer to penetrate through the interlayer insulation. This will provide better integrity to the winding structure after curing.

In high voltage applications use of special materials might be required in the interlayer insulation, like, for instance, mica tape. This material can be introduced in the slot being "wet". This means that insulation material has to be impregnated with a polymer before introducing it into the winding. It would be better to use the same polymer as the one used in the thermally conducting compound, because in this case the same curing cycle could be used for all the polymers within the winding. Using properly impregnated insulation usually increases its electrical strength and improves thermal conductivity. Besides, it will also provide better integrity to the winding structure after curing.

Figure 6:
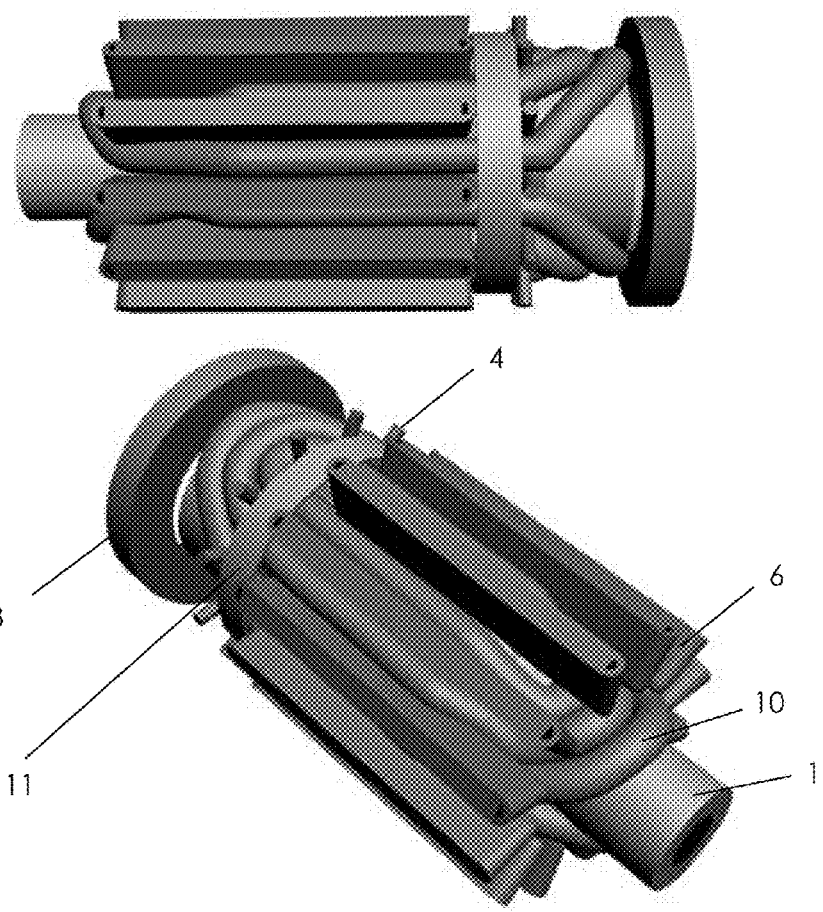
FIG. 6 represents a mandrel with 12 extractable teeth containing turning pins, a side ring, the first layer of concentric winding and a compacting bandage wound between teeth and turning pins.
Figure 7:
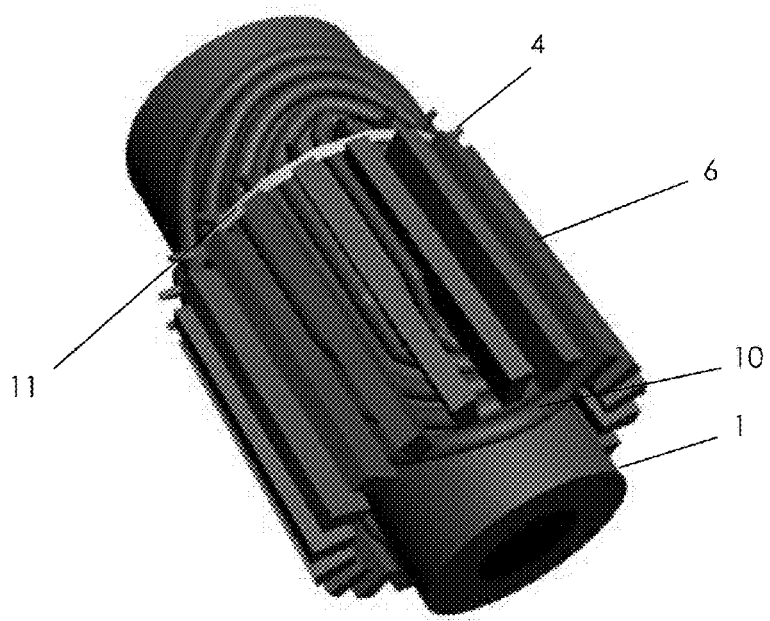
FIG. 7 represents a mandrel with 24 extractable teeth containing turning pins, the first layer of concentric winding and compacting bandage wound between teeth and turning pins.
Figure 8:
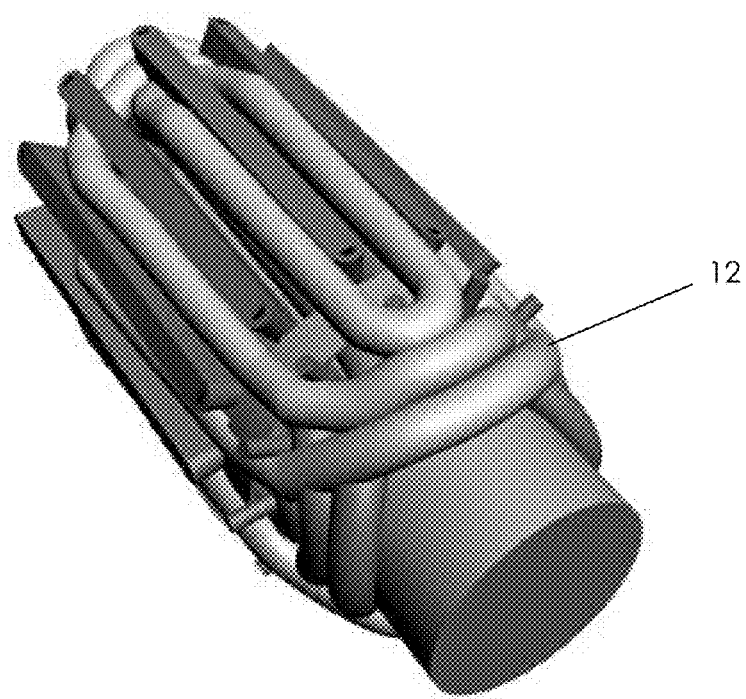
FIG. 8 represents a mandrel with 12 extractable teeth containing turning pins, the first and the second layers of concentric winding.
Figure 9:
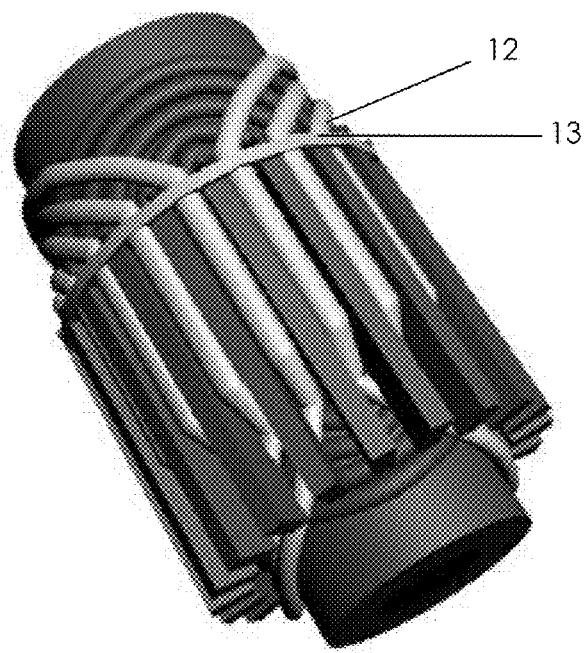
FIG. 9 represents a mandrel with 24 extractable teeth containing turning pins, the first and the second layers of concentric winding and a compacting bandage wound between teeth and turning pins.
Figure 10:
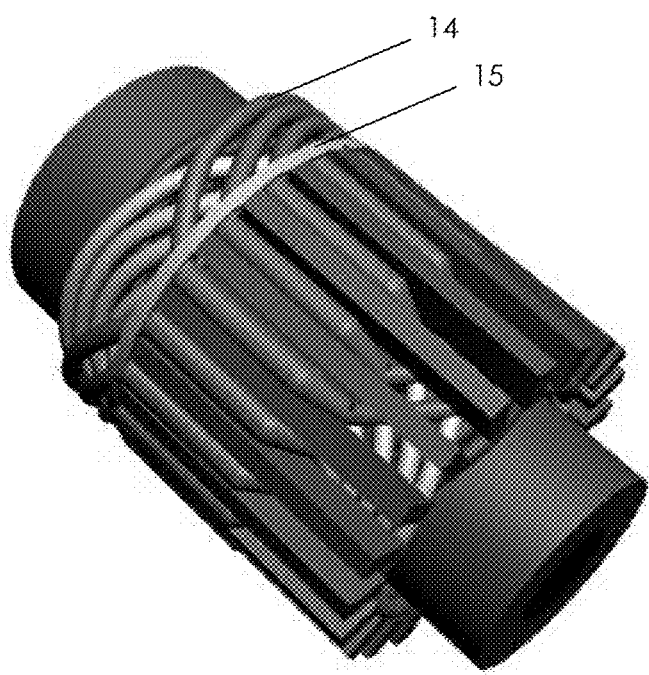
FIG. 10 represents a mandrel with 24 extractable teeth containing turning pins, the first, the second and the third layers of concentric winding and a compacting bandage wound between teeth and turning pins.

Bottom winding layers are demonstrated in FIG. 6 and FIG. 7 for different numbers of stator teeth. Corresponding top winding layers (12) for a 2-phase machine are shown in FIG. 8 and FIG. 9 accordingly. Indeed, the top winding layer can also be compacted with a bandage (13) as demonstrated in FIG. 9. The same approach can be used for a 3-phase winding system, where each layer is occupied by only one phase (FIG. 10).

Such a winding provides a maximal distribution for a given number of slots.

Figure 11:
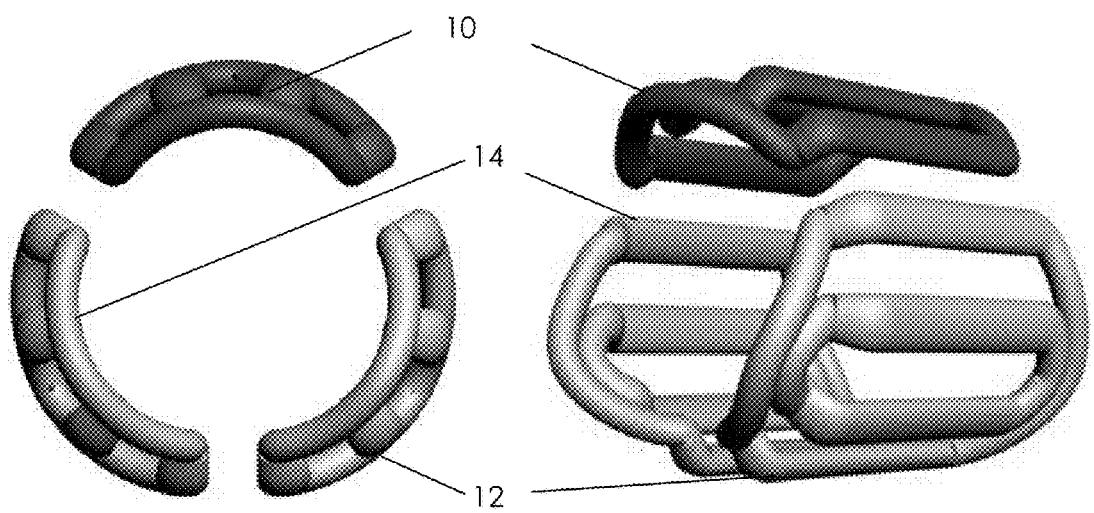
FIG. 11 represents a front and axonometric views of the first layer of a three-phase stator winding containing all three phases in one layer.
Figure 12:
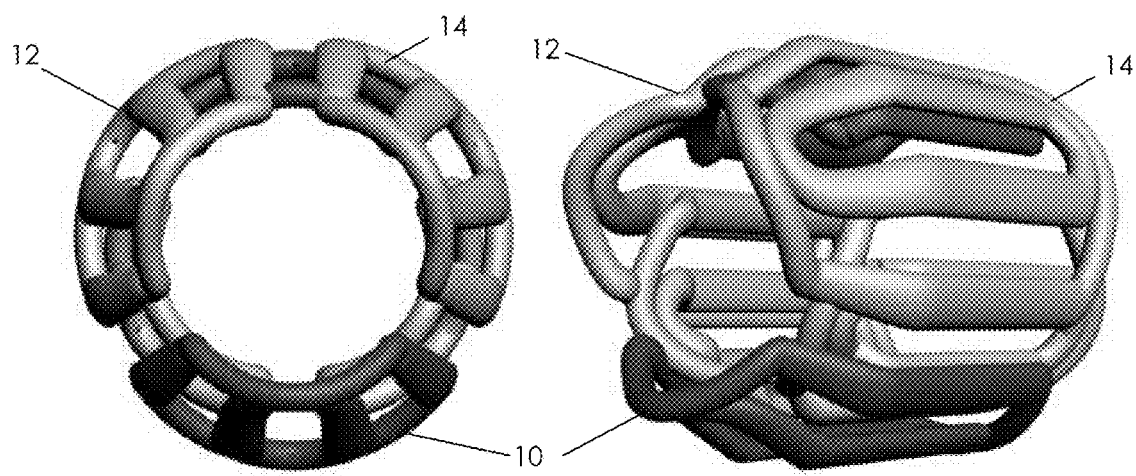
FIG. 12 represents a front and axonometric views of the first and the second layers of a three-phase stator winding containing all three phases in each layer.

A 3-phase system is demonstrated in FIG. 11 and FIG. 12.

Figure 13:
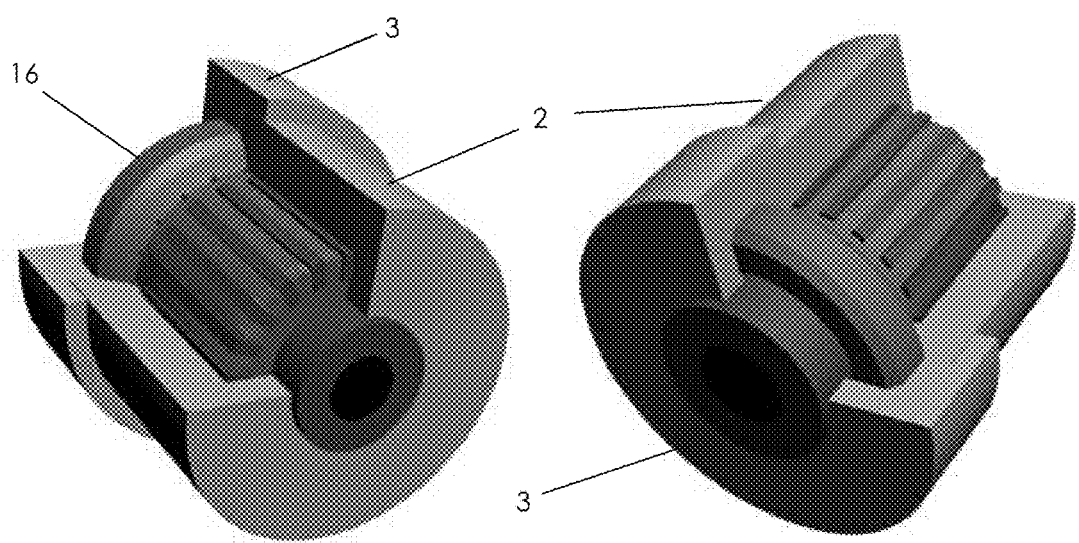
FIG. 13 represents a mandrel with extractable teeth, the concentric winding impregnated with compound and side rings.

After the winding process is completed, side rings can be pressed to the winding. Side rings (2 and 3) can either cover side surfaces of the winding (FIG. 1) or provide cover for the whole external surface of the winding (FIG. 13). After curing, the winding can be extracted from the mandrel. Depending on configuration of turning pins, they can either be left in the winding or must be pulled out from the winding. Teeth also must be removed from the winding.

Figure 14:
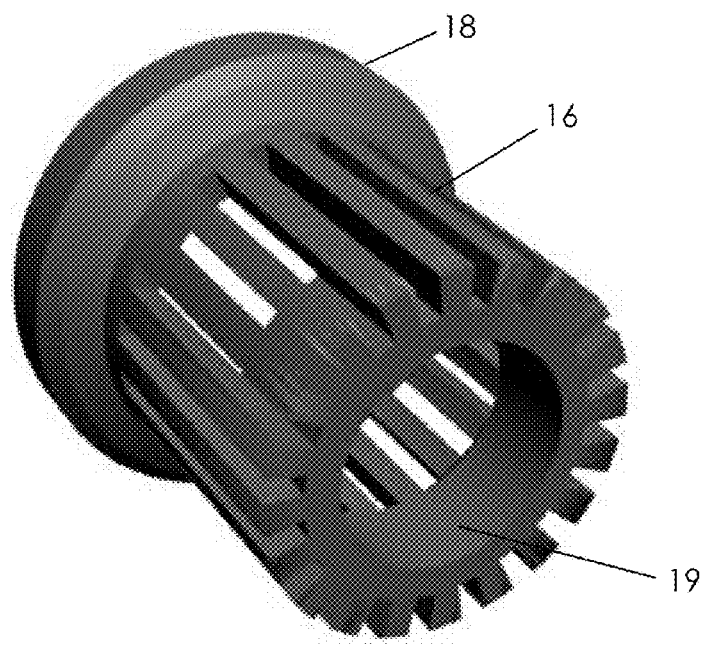
FIG. 14 represents a cured winding after removal of the tooling and extraction from the mandrel.
Figure 15:
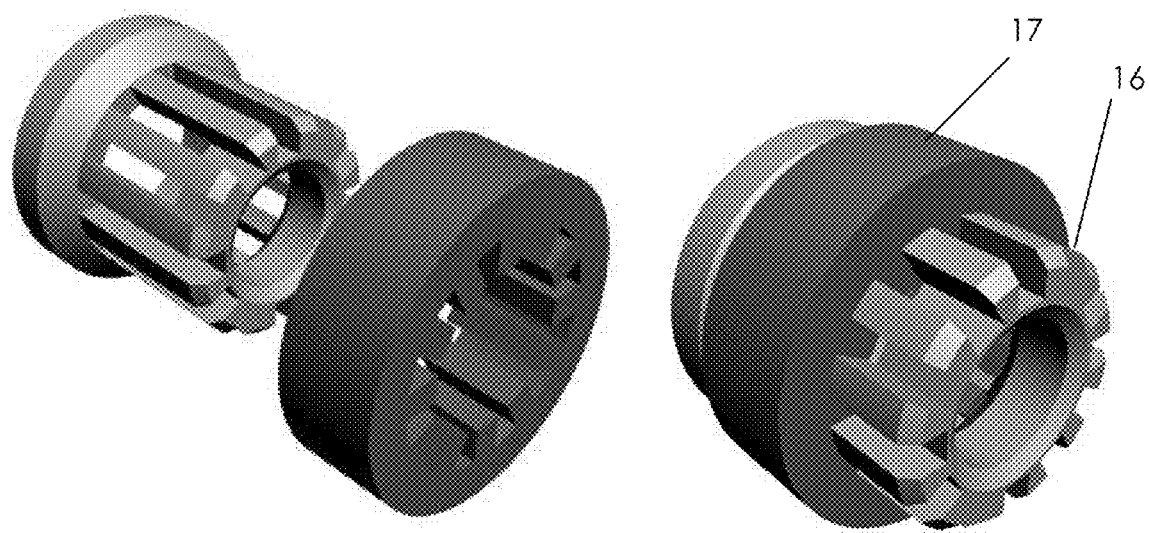
FIG. 15 represents insertion of the winding into the stator.

The cured winding is shown in FIG. 14. The ready winding represents a solid body and has the strictly determined geometrical form. The slot part of the ready winding represents rods 16 (FIG. 14). These rods are the composite material consisting of coils of the insulated copper wire and any compound. The cross section of these rods precisely coincides with the cross section of slots of stator and differs only on the value of the tolerance necessary for assembling. End parts of the ready winding represent rings 18, 19 from a composite material (FIG. 14). And one of rings 18 (FIG. 14) has inner diameter equal or hardly more than inner diameter of the stator. Outer diameter of this ring 18 (FIG. 14) should be equal to or less than outer diameter of the stator. The second ring 19 (FIG. 14) has outer diameter hardly smaller than inner diameter of the stator. It is necessary for maintenance of assembling of a winding and the stator. Inner diameter of the second ring 19 (FIG. 14) should be larger than the corresponding diameter of the rotor. Visual appearance of a winding reminds the squirrel cage of a rotor of the asynchronous motor. The ready winding doesn't demand additional slot insulation. All insulation, including turn insulation, interlayer insulation, interphase and slot insulation, it is already included in the winding. The specified technology provides high precision of manufacturing of a winding. The winding represents a separate detail and ready assembly unit of the electrical machines. After that the winding (16) can be pressed into the stator core (17) as shown in (FIG. 15). Apparently, assembling of stator represents simple process. Process of manufacturing of a winding and assembling of stator can be completely automated.

If the wire with bondable coating is used then impregnation with a compound can be omitted. In this case the tooling does not have to be solid and can be made expandable. So after the winding is finished and wires are bonded together, the teeth can retract into the winding and then the winding can be extracted from the mandrel.

The received winding can be also inserted into a slotless stator. It is obvious that it is preferable to have a slot part of a winding with a rectangular cross section.

From FIG. 15 one can clearly see that the winding can be also pressed out from the stator. As it has already been pointed out, the winding has a strictly determined geometrical form and represents a solid body. Besides, the winding has strictly determined properties, for example: a number of phases, a number of coils, diameter of the wire, a grade of wire, a number of layers in the winding, a number of slots, a number of poles, resistance of phases. Hence, such windings are interchangeable. The specified property of the proposed winding structure facilitates maintenance and repair.

What is claimed is:

1. A method of manufacturing a preliminary made insertable winding for stators with slots comprising the combination of steps:
  a. Manufacturing a metal mandrel generally of a cylindrical shape with a step for the low end-winding and optionally a slight taper in the direction of extraction and slots for installation of teeth;
  b. Installing a ring with turning pins on the top end-winding region of said mandrel and providing a gap for a compacting bandage between teeth and turning pins;
  c. Installing retractable metal teeth on the mandrel in corresponding slots wherein teeth should hang over the low end-winding region of the mandrel the teeth should have rounded edges sufficient for avoiding any damage to insulation of the wire;
  d. Installing side rings on said mandrel;
  e. Treating teeth, mandrel and side rings by release agent in order to facilitate extraction of the winding;
  f. Introducing a layer of insulation is introduced on the mandrel by pouring thermally conductive compound on the turning mandrel; the mandrel has to turn horizontally making a few turns in one direction and then a few turns in another direction in order to keep compound on the mandrel and have a uniform insulation layer on the operating region of the mandrel and teeth; after that curing must be performed while the mandrel keeps turning;
  g. Pouring thermally conducting compound on the mandrel comprising polymer and powder of non-conducting material;
  h. Fixation and insulation of the first end wire for each new coil;
  i. Manufacturing coils using insulated magnet wire with the wire going under the teeth in the low end-winding region;
  j. Fixation and insulation of the second end wire for a completed coil;

k. Repeating steps g.-j. for each new coil;
l. Manufacturing and/or installing interlayer insulation upon each completed winding layer;
m. Winding a compacting bandage on the top end-winding region between teeth and turning pins upon completing each new winding layer;
n. Repeating steps g.-m. for each new winding layer;
o. Compacting and compressing the winding using a combination of the outer shell and side rings;
p. Curing the winding;
q. Removing side rings and extracting the winding from the mandrel;
r. Removing teeth from the winding;
s. Installing the winding into the stator.

2. The method in accordance with claim 1 wherein a preliminary made insulation layer is installed on the mandrel with teeth.

3. The method in accordance with claim 1 wherein wires with bondable coating are used and bonding is applied after the winding is completed.

4. The method in accordance with claim 1 wherein
a. A certain amount of magnetic compound consisting of a mixture of a polymer and powder of soft magnetic material is poured between teeth before the winding;
b. Tangentially magnetized permanent magnets are embedded into the said teeth and both the mandrel and teeth are made of not-magnetic material;
c. This magnetic compound is cured while the mandrel is slowly turning.

5. The method in accordance with claim 1 wherein pieces of soft magnetic material are laid between teeth before beginning of the winding.

6. The method in accordance with claim 1 wherein the interlayer insulation is provided by according strengthening of wire insulation for turns coming in direct contact with another coil.

7. The method in accordance with claim 1 wherein the interlayer insulation is provided by installing a net over the mandrel with winding with openings for teeth.

8. The method in accordance with claim 1 wherein the interlayer insulation is provided by spraying a fast-curable polymer of a completed winding layer.

9. The method in accordance with claim 1 wherein a high temperature polymer with high electrical strength and without filler is used instead of thermally conducting compound.

10. The method in accordance with claim 1 wherein the stator is slotless.

11. A winding of electrical machines, produced according to technology described in claim 1, representing a solid body with strictly determined geometrical sizes, comprising:
a. A slot part, representing rods having the cross section strictly coincident with the cross section of the stator slot with specified tolerance necessary for assembling;
b. End parts of winding, representing two rings: the outer diameter of one of the rings is less than the inner diameter of the stator, and the inner diameter of this ring is larger than the corresponding diameter of the rotor; the inner diameter of the second ring is equal to or larger than the inner diameter of the stator, and the outer diameter of this ring is equal to or less than the outer diameter of the stator.

* * * * *